United States Patent [19]

Eng et al.

[11] Patent Number: 4,589,110
[45] Date of Patent: May 13, 1986

[54] SIGNAL PROCESSOR (SYSTEM) FOR REDUCING BANDWIDTH AND FOR MULTIPLEXING A PLURALITY OF SIGNALS ONTO A SINGLE COMMUNICATIONS LINK

[75] Inventors: Kai Y. Eng, Middletown; Barin G. Haskell, Tinton Falls, both of N.J.

[73] Assignee: AT&T Bell Laboratories, Murray Hill, N.J.

[21] Appl. No.: 652,741

[22] Filed: Sep. 19, 1984

Related U.S. Application Data

[63] Continuation-in-part of Ser. No. 457,289, Jan. 12, 1983, abandoned, which is a continuation of Ser. No. 276,876, Jun. 24, 1981, abandoned.

[51] Int. Cl.$^4$ .......................... H04J 3/18; H04N 7/12
[52] U.S. Cl. .................................. 370/118; 370/109; 358/133; 375/122
[58] Field of Search .................. 370/118, 109; 358/12, 358/13, 14, 142, 146, 147, 133, 135, 136, 152; 333/14; 381/34; 375/122

[56] References Cited

U.S. PATENT DOCUMENTS

| | | | |
|---|---|---|---|
| 3,697,682 | 10/1972 | Berg | 358/133 |
| 4,027,333 | 5/1977 | Kaiser et al. | 358/146 |
| 4,151,550 | 4/1979 | Dinstein | 358/13 |
| 4,215,370 | 7/1980 | Kirk, Jr. | 358/146 |
| 4,300,161 | 11/1981 | Haskell | 358/142 |

OTHER PUBLICATIONS

Flood et al: "Time-Compression-Multiplex Transmission", *Proc. of the IEEE*, vol. 111, No. 4, Apr. 1964, pp. 647-688.
Abbott: "Transmission of Multiple Television Programs via a Single Satellite Transponder", *Pacific Telecomm'ns Conf.*, Jan. 1979, pp. 4334-4337.
Klensch et al: "Two-for-One Video over Microwave Terrestrial Links", *RCA Review*, vol. 41, Sep. 1980, pp. 387-406.
Kaplan: "A New Technique for Transmitting Two High Quality Video Signals Over a Single Terrestrial Microwave Channel", *RCA Review*, Sep. 1980, pp. 407-420.
Haskell: "Time-Frequency Multiplexing ... Simulation Results", Bell System Tech. Journal, vol. 60, No. 5, pp. 643-660, May-Jun. 1981.
Eng & Haskell: "TV Bandwidth Compression ... Satellite Transmissions" National Telecommunications Conf., Nov. 29-Dec. 3, 1981, pp. D7.4.1-D7.4.3.

*Primary Examiner*—Douglas W. Olms
*Attorney, Agent, or Firm*—Walter G. Nilsen

[57] ABSTRACT

The bandwidth required for a regularly occurring signal, such as a television signal, as received from a signal source can be substantially reduced by not transmitting each and every one of the horizontal scan lines. Rather, firstly, one or more selected lines may be transmitted and, secondly, instead of transmitting the remaining, unselected lines, a signal representing a predetermined arithmetic difference among predetermined ones of the scan lines may be transmitted. The bandwidth may be further reduced by a time expansion of the time interval of the selected line signal and by a time compression of the time interval of the differential signal. The bandwidth required for each regularly occurring signal as received from each of a plurality of N signal sources may be more efficiently used by time compression multiplexing the respective time expanded and time compressed signals.

12 Claims, 3 Drawing Figures

SIGNAL PROCESSOR (SYSTEM) FOR REDUCING BANDWIDTH AND FOR MULTIPLEXING A PLURALITY OF SIGNALS ONTO A SINGLE COMMUNICATIONS LINK

CROSS REFERENCE TO RELATED APPLICATIONS

This is a continuation-in-part of our copending application Ser. No. 457,289, filed Jan. 12, 1983, now abandoned, which is a continuation under 37 CFR 1.60 of application Ser. No. 276,876, filed June 24, 1981, now abandoned.

TECHNICAL FIELD

This invention relates to a signal processor (system) and, more particularly, to a signal processor and system for reducing bandwidth and for multiplexing a plurality of signals onto a single communications link.

BACKGROUND OF THE INVENTION

In a communications system, signals may occur in some regular fashion. In one such system, e.g., in a pulse code modulated (PCM) system such as the Bell System T-Carrier system, analog signals may be sampled at a clock rate of 8,000 Hertz for conversion to a digital PCM character. The PCM character may be multiplexed into a time slot of 193-bit frame and the frame then transmitted at a bit rate of 1.544 megabits per second over a communications link to a receiver. The frame usually includes a framing signal and a plurality of characters, each character from a different one of a plurality of input trunks, typically 24 trunks. Thus, the PCM characters may occur in some regular fashion such as the first character in a time interval (0, T), a second character in a time interval (T, 2T), a third character in a time interval (2T, 3T), etc.

In another such system, e.g., in a television broadcasting system, it is common for a television picture scene to be sequentially scanned from left-to-right and top-to-bottom as a series of narrow horizontal scan lines somewhat in a manner analogous to the way the eye of a reader scans a page of printed material. The scanning process usually traverses 525 horizontal scan lines within 1/30 of a second to form a picture frame. Thus, television scan lines may occur in some regular fashion such as the first scan line in a time interval (0, T), a second scan line in a time interval (T, 2T), a third scan line in a time interval (2T, 3T), etc.

To digress, clearly still other regularly occurring signals may occur. However, for brevity, we hereinafter disclose our bandwidth reduction and multiplexing signal processor and system in terms of video signals such as television signals with an understanding that our processor and system are not limited to video signals but extend to signals of whatever nature that may occur in some regular fashion.

Continuing, to reduce flicker, it is common to interlace the horizontal lines of a frame. For example, the odd numbered lines could comprise an odd field while the even numbered lines could comprise an even field. The two fields then comprise the frame. Commonly, the first field is first scanned within 1/60 of a second. Thereafter the second field is scanned in the next 1/60 of a second. The first field is transmitted in one time interval followed by the second field in a second time interval whereby the lines are interlaced. It is also well known to those skilled in the art that various blanking pulses and synchronizing pulses are inserted usually at the ends of the scan lines as well as at the ends of the picture fields and frames.

In today's technology, it is common to transmit such television picture signals by way of a satellite transponder channel which commonly employs frequency modulation and has a bandwidth of about 36 megahertz (MHz). Indeed, to determine the bandwidth (BW) required for transmission, a well-known equation called the Carson equation is generally used where $BW = 2(\Delta f + f_m)$ and $\Delta f$ is the peak frequency deviation commonly 4 MHz and $f_m$ is the upper baseband frequency commonly 4.2 MHz for National Television Standard Committee (NTSC) color television pictures. The Carson bandwidth is usually quite generous and provides for the passage of sidebands that are within 10 percent of the unmodulated level. Furthermore, the typical transponder channel is about twice the Carson bandwidth.

Obviously, bandwidth is a precious resource in a communications system. With signals such as television signals using relatively large bandwidths, the art is ever looking for bandwidth reduction arrangements. For example, U.S. Pat. No. 4,215,370, issued July 29, 1980 and entitled "Satellite Video Multiplexing Communications System", discloses a communications system for distributing two distinct video programs via a single satellite channel using time division principles and for transmitting alternating lines of video information for the two video programs by a single frequency modulated carrier. The alternating lines are compacted in time and occupy a substantial portion of the synchronizing pulse period of the video lines. One line is partially repeated to reduce spurious system transient responses.

However, known arrangements for transmitting a plurality of signals on a single communications link tend to use techniques which have a debilitating effect upon the quality of the received signal.

SUMMARY OF THE INVENTION

This and other problems are mitigated in accordance with the principles of our invention. According to one aspect of our invention, the bandwidth required for a regularly occurring signal such as a video signal as received from a signal source can be substantially reduced by not transmitting the signal appearing in each and every one of the regular intervals, e.g., by not transmitting each and every one of the horizontal scan lines of the picture frame. For example, firstly, one or more selected lines may be transmitted and, secondly, instead of transmitting the remaining, unselected lines, a signal representing a predetermined arithmetic relationship such as an arithmetic difference among predetermined ones of the scan lines may be transmitted. According to a second aspect of our invention, the bandwidth can be further reduced by a time expansion of the time interval of a first signal and by a time compression of the time interval of the arithmetic signal, e.g., a differential signal. According to a third aspect of our invention, the bandwidth required for each regularly occurring signal as received from each of a plurality of signal sources can be more efficiently used by time compression multiplexing the respective time expanded and time compressed signals.

BRIEF DESCRIPTION OF THE DRAWING

Our invention should become fully apparent when taken in connection with the following detailed description and accompanying drawing in which.

DETAILED DESCRIPTION

Figure 1:
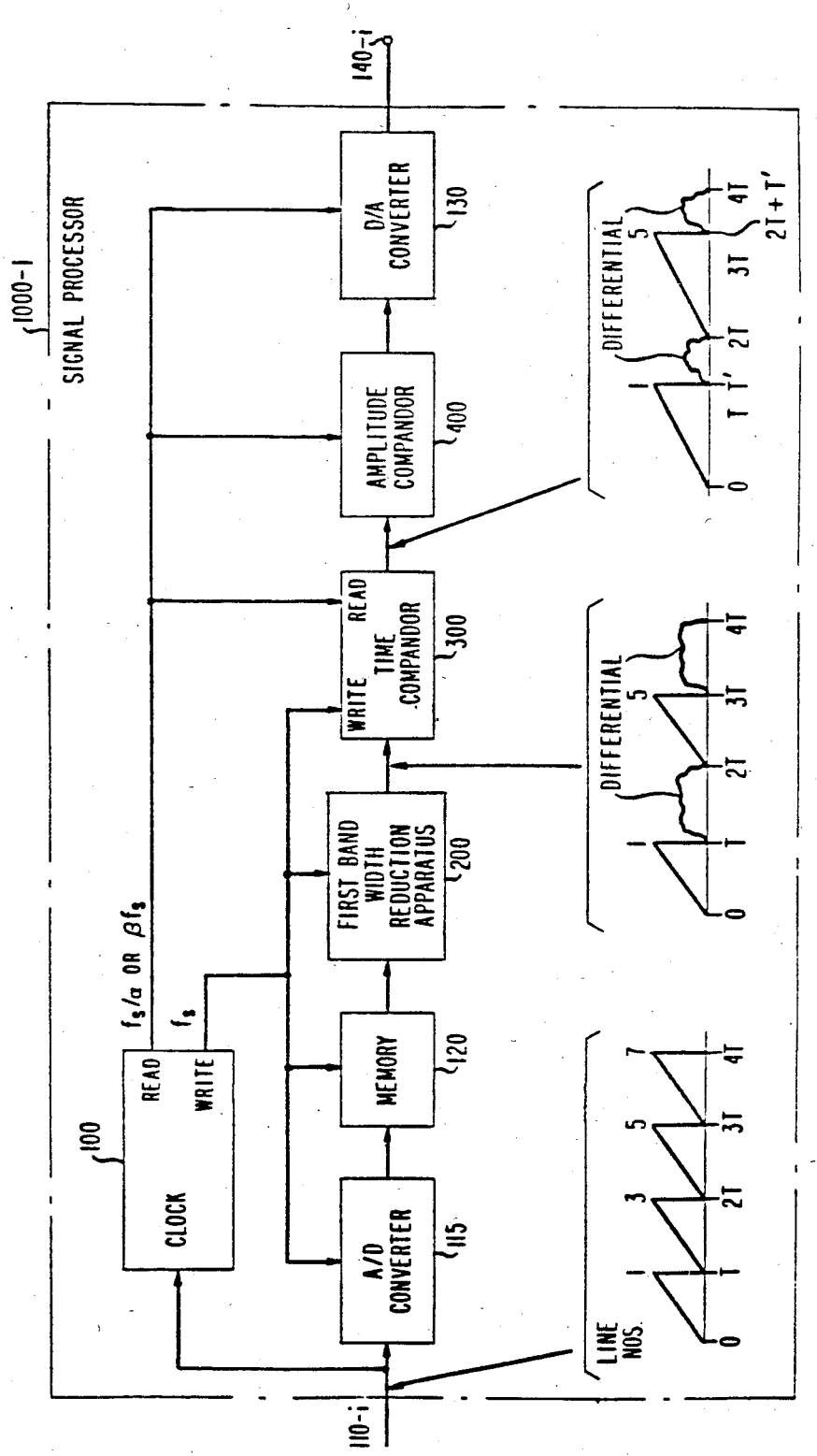
FIG. 1 illustrates a signal processor in accord with the principles of our invention.

Regularly occurring signals, e.g., signals which are detectable within prefixed time intervals such as time slots in the multiplexing art or scan lines in the television art are often communicated over a communications link. Our hereinafter described illustrative signal processor and time multiplexing system offer a reduced bandwidth for communicating such signals. Although there are many different regularly occurring signals, we, for reasons of brevity and not by way of limitation, describe our improvement in terms of video signals such as occur in the facsimile art or the television art.

According to one aspect of our invention, the bandwidth required for regularly occurring signals can be substantially reduced by not transmitting the signals appearing or included in each and every one of the regularly occurring time intervals. Rather, firstly, the signal(s) in one or more time intervals may be transmitted and, secondly, instead of transmitting the signals in the remaining, unselected time intervals, a signal representing a predetermined arithmetic relationship among the signals detected in predetermined ones of the time intervals may be transmitted. For example, consider the odd field of a two field, interlaced picture frame, i.e., the field including the odd numbered lines. As partly illustrated in FIG. 1, we assume that line 1 is selected for transmission. Ordinarily, line 3 would be transmitted after line 1. However, according to this first aspect of our invention, line 3 is not so transmitted. Instead, a signal representing a predetermined arithmetic relationship such as a signal comprising a predetermined arithmetic difference among predetermined ones of the scan lines may be transmitted. Although many alternative arithmetic signals could be used, in our example we use the difference between line 3 and the arithmetic average of the lines before and after line 3; to wit: a differential signal comprising:

$$\text{line } 3 - \frac{\text{line } 1 + \text{line } 5}{2} \qquad (1)$$

Thus, firstly, the selected line 1 signal is transmitted and, secondly, the differential signal of equation (1) is transmitted.

Next, we assume that line 5 is selected for transmission. Ordinarily, line 7 would be transmitted after line 5. However, according to this first aspect of our invention, line 7 is not so transmitted. Instead, a differential signal comprising the arithmetic differences between line 7 and the arithmetic average of the lines before and after line 7 may be transmitted; to wit: a differential signal comprising:

$$\text{line } 7 - \frac{\text{line } 5 + \text{line } 9}{2} \qquad (2)$$

This process of selecting and transmitting alternate lines followed by providing and transmitting a differential signal may continue through both the odd field and the even field until the entire picture frame is transmitted and continue thereafter on a frame-by-frame basis.

Advantageously, according to this first aspect of our invention, experimentation has indicated that, while the actual signal typically requires a bandwidth of about 4.2 MHz, such a differential signal may require a reduced bandwidth of about 3 MHz without seriously affecting picture quality. That is, experimentation has indicated that the arithmetic signal may be bandlimited to a bandwidth less than the bandwidth of the actual line signal. Also advantageously, according to this first aspect of our invention, the horizontal blanking interval of the differential signal is reduced to zero thereby further reducing bandwidth requirements. Commonly, the horizontal blanking interval comprises about 17 percent of a line scan interval of T seconds. An alternative to reducing a blanking interval to zero could include inserting an information signal in lieu thereof.

According to a second aspect of our invention, the bandwidth required for a signal can be substantially reduced by a time expansion of a selected signal time interval and by a time compression of an arithmetic signal time interval. For example, assume the scan time of each line is T seconds. Hence, the time interval (0, T) could contain the 4.2 MHz selected line 1 signal while the interval (T, 2T) could contain the 3 MHz differential signal. According to this second aspect, a time expansion of the 4.2 MHz line signal from the original interval (0, T) to a new expanded interval (0, T') where T' > T and a time compression of the 3 MHz differential signal from the original interval (T, 2T) to a new compressed interval (T', 2T) further reduces bandwidth. More specifically, we assume a time expansion factor $\alpha$, where $\alpha$ is greater than one, and a time compression factor $\beta$, where $\beta$ is greater than one. Further, we assume that the expansion and compression factors are chosen so that the bandwidth of the signal in each of the two new (and unequal) time intervals (0, T') and (T', 2T) are identical. This bandwidth identity relationship can be written mathematically as:

$$\frac{f_1}{\alpha} = \beta f_2 \qquad (3)$$

where $f_1$ and $f_2$ are the maximum frequencies in the original intervals (0, T) and (T, 2T), respectively. In the instant example, $f_1 = 4.2$ MHz and $f_2 = 3$ MHz. Still further, we assume that the expanded time interval plus the compressed time interval will comprise a total time interval of 2T seconds and hence correspond to the sum of the original time intervals. In light of the above and inasmuch as the time interval for the differential signal can be reduced an additional approximately 17 percent, which 17 percent represents the horizontal blanking interval, the following time interval relationship exists:

$$\alpha T + \frac{0.83T}{\beta} = 2T \qquad (4)$$

where the first term $\alpha T$ corresponds to the new expanded interval (0, T') and the scond term $0.83T/\beta$ corresponds to the new compressed interval (T', 2T). Solving equations (3) and (4) simultaneously obtains a time expansion factor $\alpha$ of about 1.255 and a time compression factor $\beta$ of about 1.115. For convenience, our numbers are rounded-off. Further in accord with this second aspect of our invention, the bandwidth of each of the two new time intervals has been substantially reduced from a maximum bandwidth of 4.2 MHz to a new bandwidth of about $(f_1/\alpha = \beta f_2 =) 3.34$ MHz.

The foregoing description according to the second aspect of our invention, illustrates the reduction in bandwidth of a signal from a maximum bandwidth of 4.2 MHz to a new overall bandwidth of about $(f_1/\alpha = \beta f_2 =) 3.34$ MHz. The bandwidth was reduced by choosing (or solving for) $\alpha$ and $\beta$ in equation (3) such that the bandwidth of the two new time intervals would be substantially identical, or equal. Further experimentation has led to the conclusion that, in some cases, there are at least two reasons where the equality according to equation (3) may not be desirable. Firstly, $\alpha$ and $\beta$, as obtained by the simultaneous solution of equations (3) and (4), might lead to hardware complexity. Secondly, a signal processor (system), having the reduced bandwidth achieved through the above technique, i.e., having the new overall bandwidth of about 3.34 MHz, might have some inefficiencies as to performance, for example, in the case where frequency modulation is employed, to transmit the said processed TV signal, and the peak-to-peak amplitude of a selected line signal is relatively large when compared to the amplitude of a differential signal.

To solve such problems, it may be desirable to compress the time interval of the differential signal even more than same was compressed for obtaining identical bandwidths in each of the two new time intervals. For example, a new alternative time expansion factor $\alpha'$ and a new alternative time compression factor $\beta'$, where $\alpha'$ is greater than $\alpha$ and $\beta'$ is greater than $\beta$, may be employed such that equation (3) may be rewritten as:

$$\frac{f_1}{\alpha'} < \beta' f_2 \qquad (3.1)$$

From this and (a) since the selected line signal bandwidth $f_1$ is greater than the differential signal bandwidth $f_2$ and (b) since new compression factor $\alpha'$ is greater than factor $\alpha$ and (c) since new expansion factor $\beta'$ is greater than factor $\beta$, it follows firstly that:

$$\frac{f_1}{\alpha'} < \frac{f_1}{\alpha} \qquad (3.2)$$

and secondly that the new line-signal bandwidth is even more reduced, in our example, reduced below 3.34 MHz. On the one hand, a result of this improvement is that the selected line signal can tolerate even more frequency deviation than in our prior example since its new bandwidth has been further reduced. On the other hand, another result of this improvement is that the differential signal would not adversely suffer any untoward degradation even though its new bandwidth has been further expanded. This other result obtains since the relatively smaller amplitude of the differential signal (vis-a-vis the amplitude of the selected line signal) would not normally lead to the full use of the permissible maximum peak-to-peak frequency deviation. Moreover, the signal-to-noise performance of the differential signal can be further enhanced through the use of amplitude compandor 400 illustrated in FIG. 1.

According to a third aspect of our invention, the bandwidth required for a signal can be more efficiently used by time compression multiplexing (rather than the more common technique of frequency division multiplexing) the respective signals from each of a plurality of N signal sources. For example, each signal source may extend a signal through an arrangement for reducing bandwidth by transmitting signals in selected time intervals and by otherwise transmitting differential signals, as aforedescribed according to the first aspect of our invention. The signal may then be extended through an arrangement for further reducing bandwidth by expanding and compressing time intervals, as aforedescribed according to the second aspect of our invention, and thereafter extended onward to a respective one of the N input terminals of time compression multiplexing apparatus. One type of time compression multiplexing apparatus may be the type disclosed in the patent application of B. G. Haskell, entitled "Time Compression Multiplexing of Video Signals" and filed Mar. 3, 1980, Ser. No. 06/126,422, and issued Nov. 10, 1981 as U.S. Pat. No. 4,300,161, the teachings of which are herein incorporated by reference. Each of the N time expanded and time compressed signals may be time compression multiplexed for extension to a signal communications link.

As an aside, it may be noted that as a result of expanding the selected time interval and of compressing the differential time interval, the time slot interval of a resultant time compression multiplexed signal may be a time interval of about 2T seconds rather than T seconds.

As a further aside, it may be noted that, because this companding is performed during the bandwidth reduction process as aforedescribed according to the second aspect of our invention, the time compression required for the time compression multiplexing can be incorporated conveniently in the bandwidth reduction process without additional hardware. This may result in a simplification of the overall system.

Figure 2:
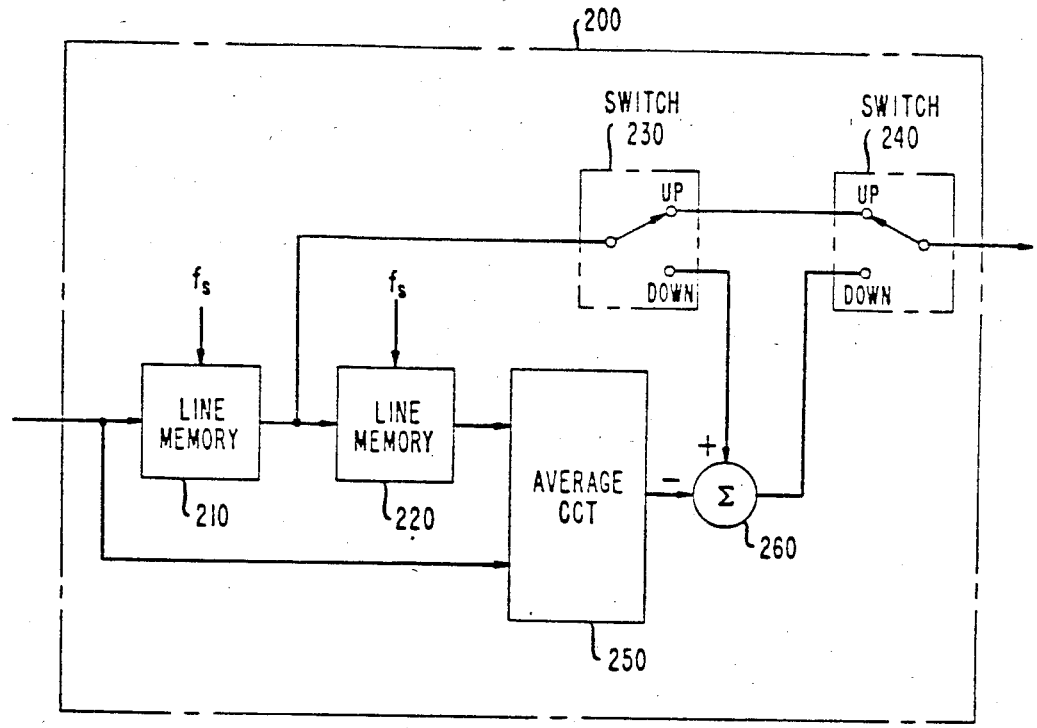
FIG. 2 illustrates first bandwidth reducing apparatus 200 of a type useable in the signal processor of FIG. 1.

We now turn to describing an illustrative embodiment of the principles of our invention. In accord with the principles of our invention, the bandwidth of a regularly occurring signal can be substantially reduced using apparatus such as signal processor 1000-$i$, which is schematically illustrated in FIG. 1. Operationally, a regularly occurring signal may be extended from a signal source (not shown) through input terminal 110-$i$, analog-to-digital converter 115, and memory 120 to an input of first bandwidth reduction apparatus 200. Reduction apparatus 200, which is schematically illustrated in FIG. 2, is, for example, for providing and extending both a signal detected in a selected time interval and a predetermined differential signal to an input of second bandwidth reduction apparatus, here time compandor 300. Time compandor 300 is (a) for expanding the selected time interval and (b) for compressing the differential signal time interval and (c) for extending the thereby bandwidth reduced signal optionally either directly to an input of digital-to-analog converter 130 or to an input of amplitude compandor 400 and thence to digital-to-analog converter 130. Optional amplitude compandor 400 may be any standard compandor such as a $\mu$-law compandor or an A-law compandor whereby noise may be suppressed or at least mitigated.

The thus bandwidth reduced signal may thereafter be extended to output terminal 140-i and later supplied to a communications link.

More particularly, first reduction apparatus 200 is for reducing the bandwidth of the input regularly occurring signal according to the aforedescribed first aspect of our invention. For example, referencing FIG. 1, assume a sequence of odd-numbered lines of a video picture are extended sequentially from input terminal 110-i through memory 120 to first reducing apparatus 200 and, therein as shown in FIG. 2, through line memory 210 to line memory 220 for buffering a scan line. Thus, recalling the aforedescribed equation (1), as line 1 is extended from memory 120 to line memory 210, line 3 is written into memory 120. Next, as line 5 is extended to memory 120, line 3 is extended from memory 120 to line memory 210 while, concurrently, line 1 is extended from memory 210 jointly to line memory 220 and through the UP position of each of switches 230 and 240 to time compandor 300. Thereby, selected line 1 is written into compandor 300 and is available for transmission over the communications link.

It is worthy of note that memories 120, 210 and 220 have buffered therein respectively lines 5, 3 and 1 for providing the differential signal of equation (1). Hence, responsive to line 7 being extended to memory 120, line 5 is extended jointly to memory 210 and to a first input of averaging circuit 250. Concurrently, line 3 is extended from memory 210 through the DOWN position of switch 230 to a first positive input of difference circuit 260. Also, concurrently, line 1 is extended from memory 220 to a second input of averaging circuit 250. An output of averaging circuit 250 is the arithmetic average of its respective first and second inputs, i.e., (line 1 + line 5)/2, which average is extended to a second negative input of difference circuit 260. An output of circuit 260 is the differential signal given by equation (1), which differential signal is extended through the DOWN position of switch 240 to time compandor 300 and written therein. Thereby the selected line signal followed by the differential signal, according to the aforedescribed first aspect of our invention, are provided to time compandor 300.

Regarding time compandor 300, compandor 300 may be a standard random access memory:

(a) into which signals are written for a time interval of 2T seconds and at a clock rate corresponding to a sampling frequency $f_s$ Hertz and (b) as to the selected line signal, from which signals are read for an expanded time interval of $\alpha T$ seconds and at a time expansion clock rate of $f_s/\alpha$ Hertz as well as (c) as to the differential signal, from which signals are read for a compressed time interval of $0.83T/\beta$ seconds and at a time compression clock rate of $\beta f_s$ Hertz.

Clock 100 may be any standard apparatus for deriving a clock rate signal $f_s$ from an input signal. Also, clock 100 may include standard multiplication and division apparatus for deriving and supplying the expansion $f_s/\alpha$ and compression $\beta f_s$ clock rates for, respectively, $\alpha T$ and $0.83T/\beta$ seconds. Thereby, the time interval of the selected signal followed by the time interval of the differential signal, according to the aforedescribed second aspect of our invention, are time expanded and time compressed, respectively, for further reducing bandwidth.

Figure 3:
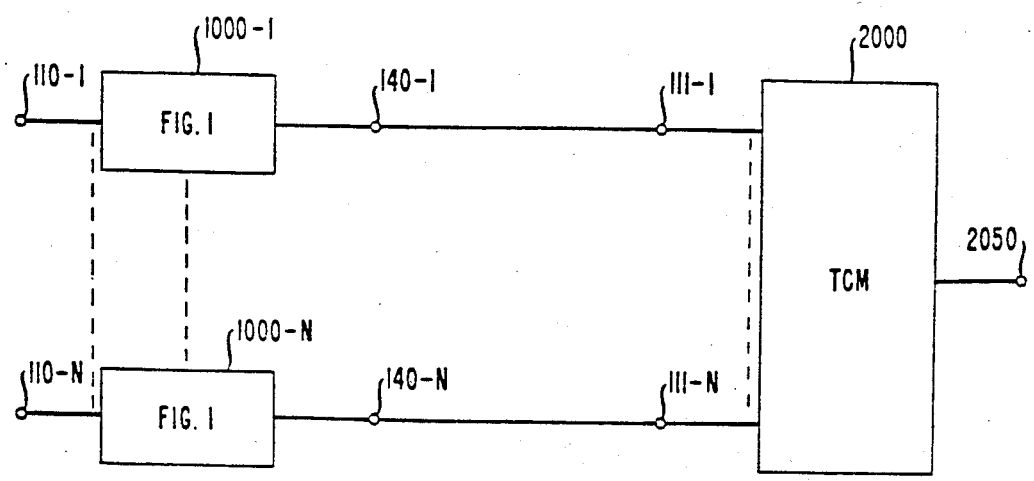
FIG. 3 illustrates a time multiplexing signal processor system in accord with the principles of our invention.

Referring to FIG. 3, a plurality of the FIG. 1 signal processors are illustratively shown as apparatus 1000-1 through 1000-N. In accord with the aforedescribed third aspect of our invention, a regularly occurring signal from each of the plurality of N sources (not shown) may be extended to a respective input terminal 100-i thence through signal processor 1000-i and output terminal 140-i, to an input terminal 111-i of time compression multiplexing apparatus 2000. Time compression multiplexing (TCM) apparatus 2000 may be substantially the same as that disclosed in the aforecited patent application of B. G. Haskell, entitled "Time Compression Multiplexing of Video Signals", and filed Mar. 3, 1980 as Ser. No. 06/126,422, and issued Nov. 10, 1981 as U.S. Pat. No. 4,300,161. Generally in time compression multiplexing, the signal detected at each input terminal 111-i through 111-N is stored for a short period of time. The signals from all N terminals are then read from the store, compressed in time and transmitted over communications link 2050 to a receiver where the signals are expanded.

More specifically, TCM apparatus 2000 may time compress the signal detected at each respective input terminal 111-i from a time interval (0, 2T) to a time interval (0, 2T/M); and hence by a predetermined compression factor M, e.g., M=N. In general, the TCM apparatus may compress the signal detected at terminal 111-i to a time interval $$\left[\frac{(i-1)2T}{N}, \frac{i2T}{N}\right],$$

where i=1, 2, ..., N. Thus, there are (M=)N such intervals in the total multiplexing time slot interval (0, 2T). The TCM apparatus may include apparatus for modulating each of the respective input signals and for extending the respective modulated signal through a respective first delay network and, after adding the several delayed signals, for introducing a second, variable delay to the sum of the modulated signals whereby a time compressed signal obtains. The modulated signal may obtain by modifying the input signal with a chirp signal. The second, variable delay may obtain by extending the modulated signal through a dispersive filter. The time compressed signal may obtain by being extracted from the dispersive filter output by an envelope detector and by being extended over communications link 2050 to a receiver where the compressed signal may be expanded.

Alternatively, as aforedescribed, the TCM apparatus may employ a design principle similar to that of the aforedescribed time compandor 300 in FIG. 1 for achieving time companding via different read and write sampling rates. In that connection, the signal in the time interval (0, T) may be time compressed to the time interval $$\left[T\left(1 - \frac{1}{N}\right), T\right],$$

and the signal in the time interval (T, 2T) may be time compressed to the interval $$\left[T\left(2 - \frac{1}{N}\right), 2T\right],$$

and so on.

Although our invention has been described and illustrated in detail, it is to be understood that same is by way of illustration and example only.

For brevity, we have disclosed the principles of our invention using for illustration a transmitter signal processor. Clearly, the principles of our invention apply to a receiver signal processor.

Also for brevity, as aforementioned, we have disclosed the principles of our invention using for illustration a video signal such as a television signal. Clearly, the principles of our invention apply to other than video signals. For example, the principles of our invention apply to any arrangement having a first signal in a first time interval such as (0, T), and a second signal in a second time interval such as (T, 2T) where, perhaps as a result of an arithmetic operation as aforedescribed, the bandwidth actually required for the first signal is not equal to the bandwidth required for the second signal.

Still also for brevity, we have disclosed the principles of our invention using for illustration an arrangement in which a first time interval was time expanded to be followed by a second time interval which is time compressed. Clearly, the principles of our invention apply to other arrangements such as a converse arrangement.

In addition, still other predetermined arithmetic relationships may be used. For example, the 4.2 MHz video signal, while commonly an interlaced signal, need not be an interlaced signal. Memory 120 may be structured to transform an interlaced signal to a sequential signal thereby functioning as a scan converter. Thence, a sequential order of scan lines, e.g., line 1, line 2, line 3, line 4, . . . may be extended from memory 120 to line memory 210. Thereafter, in the absence of averaging circuit 250, line 1 may be extended from memory 210 through the UP position of each of switches 230 and 240 to time compandor 300. Thereafter, line 2 may be extended from line memory 210 through the DOWN position of switch 230 to the first positive input of difference circuit 260. Concurrently, line 1 may be extended from line memory 220 to a second negative input of difference circuit 260. The difference between line 2 and line 1 may thereafter be extended from circuit 260 through the DOWN position of switch 240 to time compandor 300. Thereby a different predetermined arithmetic differential signal, which may be called a field differential signal versus the priorly described line differential signal, is transmitted following the selected line 1 signal. (We use the phrase "line differential signal" to describe a difference signal which relates to lines in the same field, whether odd or even. We use the phrase "field differential signal" to describe a difference signal which relates to lines in different fields, e.g., a difference between lines in an odd field and lines in an even field.) Continuing, experimentation has indicated that while the selected line signal will again typically require a bandwidth of about 4.2 MHz such a field differential signal may require a reduced bandwidth of about 2 MHz without seriously affecting picture quality. In this example, with $f_1 = 4.2$ MHz and $f_2 = 2$ MHz, the simultaneous solution of the aforedescribed equations (3) and (4) obtains a time expansion factor $\alpha$ of about 1.433 and a time compression factor $\beta$ of about 1.465. Further, the bandwidth of each of the new time intervals is reduced from a maximum bandwidth of 4.2 MHz to a new bandwidth of about $(f_1/\alpha = \beta f_2 =)2.9$ MHz.

In still another embodiment of the principles of our invention, the field differential signal just described and the line differential signal priorly described may be combined for still further reducing bandwidth. For example, a $(f_1=)4.2$ MHz video signal may be converted from an interlaced format to a sequential format for extending picture frame lines in the sequential order line 1, line 2, line 3, . . . from a output of memory 120 to line memory 210. The bandwidth reduction apparatus of FIG. 1 may be straightforwardly modified to process the video signal as follows: as line 1 arrives, it is stored in memory 210. Thereafter, as line 2 arrives, line 1 is jointly extended to line memory 220 and through the UP position of each of switches 230 and 240 to time compandor 300. As line 3 arrives, line 2 is extended from line memory 210 through the DOWN position of switch 230 to the first positive input of difference circuit 260 while, concurrently, line 1 is extended from memory 220 to a second negative input of circuit 260. The field differential signal between lines 1 and 2 may be extended from an output of difference circuit 260 through the DOWN position of switch 240 to time compandor 300. This first field differential signal, as aforedescribed, may be bandwidth limited to $(f_2=)2$ MHz without seriously affecting picture quality. Next, a line differential signal representing a difference between line 1 and line 3, which line differential signal may be bandwidth limited to $(f_3=3$ MHz without seriously affecting picture quality, may be provided and extended to time compandor 300. Finally, when line 4 arrives, a second field differential signal as between lines 3 and 4, which field differential signal may also be bandwidth limited to $(f_4=)2$ MHz, may be provided and extended to time compandor 300. This operation upon four consecutive line scan intervals, each of length T seconds, may be repeated for subsequent groups of four lines. In essence, the sequence extended to time compandor 300 includes a selected line signal, a first field differential signal, a line differential signal and a second field differential signal. In fashion parallel of that aforedescribed relative to equations (3) and (4), equations for determining the overall bandwidth may be obtained from simultaneously solving equations (5) and (6). This is, solving:

$$\frac{f_1}{\alpha_1} = \beta_2 f_2 = \frac{f_3}{\alpha_3} = \beta_4 f_4 \qquad (5)$$

$$\alpha_1 T + \frac{0.83T}{\beta_2} + 0.83\alpha_3 T + \frac{0.83T}{\beta_4} = 4T \qquad (6)$$

where $\alpha_1$ and $\alpha_3$ are time expansion factors for bandwidths $f_1$ and $f_3$, respectively; $\beta_2$ and $\beta_4$ are time compression factors for bandwidths $f_2$ and $f_4$, respectively; and the factor 0.83 is due, as aforedescribed, to the deletion of the blanking interval which commonly would consume approximately 17 percent of the scan line duration. Solving equations (5) and (6) simultaneously obtains:

$\alpha_1 = 1.68$ $\beta_2 = 1.25$ $\alpha_3 = 1.2$ $\beta_4 = 1.25$

Thereby, the bandwidth of each of the four new time intervals has been reduced from a maximum bandwidth of 4.2 MHz to a new bandwidth of about $$\left[\frac{f_1}{\alpha_1} = \beta_2 f_2 = \frac{f_3}{\alpha_3} = \beta_4 f_4 = \right] 2.5 \text{ MHz}.$$

Paralleling that aforedescribed relative to the second aspect of our invention, the just described time expansion and time compression factors, $\alpha_1, \beta_2, \alpha_3, \beta_4$, can be replaced with respectively new time expansion and compression factors, $\alpha_1', \beta_2', \alpha_3'$ and $\beta_4'$. As a result, rather than obtaining the new reduced bandwidth by solving equations (5) and (6), the new alternative factors satisfy the following constraints:

$$\left.\begin{array}{l}\frac{f_1}{\alpha_1'} < \frac{f_1}{\alpha_1} \\ \beta_2' f_2 > \beta_2 f_2 \\ \frac{f_1}{\alpha_3'} < \frac{f_1}{\alpha_3} \\ \beta_4' f_4 > \beta_4 f_4\end{array}\right\} \quad (5.1)$$

As before, the new alternative factors may, firstly, reduce hardware complexity as well as, secondly, improve system efficiency in some cases.

Still other modifications of the principles of our invention will occur to those skilled in the art. Accordingly, the invention is not to be considered limited by the embodiment shown and thus the spirit and scope of the invention are limited only by the appended claims.

What is claimed is:

1. A signal processor including an input terminal adapted to receive a regularly occurring signal, said regularly occurring signal having a sequence of prefixed time intervals, means for processing said regularly occurring signal and means for extending said processed signal to an output terminal, and characterized in that said processing means further comprises:
    means for reducing the bandwidth of said regularly occurring signal, said reducing means including:
    (a) means for time expanding the time interval of a signal appearing in one of said time intervals;
    (b) means for time compressing the time interval of a signal appearing in a different one of said time intervals; and
    (c) means for providing said time expanded signal and said time compressed signal as said processed signal.

2. The signal processor defined in claim 1 further comprising:
    (d) means for selecting a signal appearing in a predetermined one of said time intervals;
    (e) means for providing an arithmetic signal identifying a predetermined arithmetic relationship among signals appearing in predetermined ones of said time intervals; and
    (f) wherein said time expanding means comprises means for time expanding the time interval of said selected signal; and
    (g) wherein said time compressing means comprises means for time compressing the time interval of said arithmetic signal.

3. The signal processor defined by claim 1 or 2 further comprising:
    means coupled to said time expanding means and to said time compressing means for adjusting the bandwidth of said provided signal, the bandwidth being adjusted so that the bandwidth of said time expanded signal is substantially equal to the bandwidth of said time compressed signal.

4. A method for reducing the bandwidth of a regularly occurring signal, said regularly occurring signal having a sequence of prefixed time intervals and characterized in that said method further comprises the steps of:
    (a) time expanding the time interval of a signal appearing in one of said time intervals;
    (b) time compressing the time interval of a signal appearing in a different one of said time intervals; and
    (c) providing said time expanded signal and said time compressed signal to an output terminal, said ouput terminal adapted to extend said provided signal over a communications link.

5. The method defined in claim 4 further comprising the steps of:
    (d) selecting a signal appearing in a predetermined one of said time intervals;
    (e) providing an arithmetic signal identifying a predetermined arithmetic relationship among signals appearing in predetermined ones of said time intervals;
    (f) wherein said time expanding step comprises time expanding the time interval of said selected signal; and
    (g) wherein said time compressing step comprises time compressing the time interval of said arithmetic signal.

6. The method defined in claim 4 or 5 further comprising the step of:
    adjusting the bandwidth of said provided signals, the bandwidth being adjusted so that the bandwidth of said time expanded signal is substantially equal to the bandwidth of said time compressed signal.

7. A time multiplexing system comprising:
    (a) a plurality of signal processors, at least one of said signal processors for providing a time expanded signal and time compressed signal;
    (b) means for time compression multiplexing a plurality of signals onto a communications link; and
    (c) means for extending said time expanded and said time compressed signals from a respective one of said signal processors to said time compression multiplexing means for compression thereby.

8. The system defined in claim 7 wherein at least one of said signal processors further comprises:
    means for adjusting the bandwidth of said extended signals so that the bandwidth of said time expanded signal is substantially equal to the bandwidth of said time compressed signal.

9. The system defined in claim 7 wherein the time compression of said signal processor and the time compression of said multiplexing means may be jointly performed in common time compression means.

10. The signal processor defined by claim 1 or 2 further comprising:
    means coupled to said time expanding means and to said time compression means for adjusting the bandwidth of said provided signal, the bandwidth being adjusted so that the bandwidth of said time expanded signal is less than the bandwidth of said time compressed signal.

11. The method defined in claim 4 or 5 further comprising the step of:

adjusting the bandwidth of said provided signals, the bandwidth being adjusted so that the bandwidth of said time expanded signal is less than the bandwidth of said time compressed signal.

12. The system defined in claim 7 wherein at least one of said signal processors further comprises:
 means for adjusting the bandwidth of said extended signals so that the bandwidth of said time expanded signal is less than the bandwidth of said time compressed signal.

* * * * *